United States Patent [19]
Hoshikawa

[11] Patent Number: 4,709,991
[45] Date of Patent: Dec. 1, 1987

[54] LIQUID CRYSTAL DISPLAY WITH BARRIER LAYER TO REDUCE PERMEABILITY

[75] Inventor: Jun Hoshikawa, Nagano, Japan

[73] Assignee: Seiko Epson Kabushiki Kaisha, Tokyo, Japan

[21] Appl. No.: 875,519

[22] Filed: Jun. 19, 1986

Related U.S. Application Data

[63] Continuation of Ser. No. 603,865, Apr. 25, 1984, abandoned.

[30] Foreign Application Priority Data

| Apr. 26, 1983 | [JP] | Japan | 58-73329 |
| Apr. 26, 1983 | [JP] | Japan | 58-73330 |
| Apr. 26, 1983 | [JP] | Japan | 58-73331 |

[51] Int. Cl.$^4$ .................... G02F 1/13; C09K 19/00
[52] U.S. Cl. ................... 350/339 R; 428/1
[58] Field of Search ............ 428/1; 350/337, 339 R, 350/334, 341, 340, 343, 344

[56] References Cited

U.S. PATENT DOCUMENTS

| 3,700,306 | 10/1972 | Cartmell et al. | 350/341 |
| 4,068,923 | 1/1978 | Toida | 350/339 R |
| 4,183,629 | 1/1980 | Nishimura et al. | 350/334 |
| 4,228,574 | 10/1980 | Culley et al. | 350/331 R |
| 4,252,414 | 2/1981 | Kinugawa et al. | 350/339 R |
| 4,387,133 | 6/1983 | Ichikawa et al. | 350/337 X |
| 4,422,727 | 12/1983 | Baeger et al. | 350/337 X |
| 4,425,030 | 6/1984 | Schmidt | 350/330 |
| 4,474,432 | 10/1984 | Takamatsu et al. | 350/339 R |
| 4,526,818 | 7/1985 | Hoshikawa et al. | 350/337 X |

FOREIGN PATENT DOCUMENTS

| 0126558 | 10/1979 | Japan | 350/339 R |
| 0065926 | 5/1980 | Japan | 350/337 |
| 0084975 | 6/1980 | Japan | 350/338 |
| 0149909 | 11/1980 | Japan | 350/339 R |
| 0005031 | 1/1982 | Japan | 350/337 |
| 0017531 | 1/1984 | Japan | 350/334 |

*Primary Examiner*—Stanley D. Miller
*Assistant Examiner*—David Lewis
*Attorney, Agent, or Firm*—Blum Kaplan

[57] ABSTRACT

A liquid crystal display panel including at least one transparent plate formed of plastic material including a barrier coating layer for reducing permeability of the resin plate to air and/or water vapor is provided. A transparent electrode is formed on the inner surface of the transparent plate. Transparent resin plates are desirable as they are optically clear for producing a clear display, light weight and sufficiently flexible to impart impact resistance to the display panel.

20 Claims, 5 Drawing Figures

LIQUID CRYSTAL DISPLAY WITH BARRIER LAYER TO REDUCE PERMEABILITY

This is a continuation of application Ser. No. 603,865, filed Apr. 25, 1984, now abandoned.

BACKGROUND OF THE INVENTION

This invention relates to a liquid crystal display panel, and more particularly to a liquid crystal display panel including at least one transparent plate formed of a polymeric material.

Recently, it has been proposed to form liquid crystal display panels using synthetic or plastic resin transparent plates in place of glass. Plastic resin transparent plates are desirable as they are optically clear and would provide a clear display. Additionally, they are thin and light weight when compared to inorganic glass. Finally, a plastic resin transparent plate is flexible and would impart impact resistance to a liquid crystal display panel formed of such plastic transparent plates. However, in view of the fact that plastic resins are generally highly permeable to air and water vapor, liquid crystal display panels formed from plastic resin transparent plates are not sufficiently reliable.

Accordingly, it is desirable to provide a liquid crystal display panel formed of plastic resin transparent plates which overcomes these problems.

SUMMARY OF THE INVENTION

Generally speaking, in accordance with the invention a liquid crystal display panel wherein at least one of the opposed transparent plates for sandwiching the liquid crystal material therebetween is formed of a plastic material, such as a phenoxy resin and a barrier coating layer is formed on the surface of the transparent substrate which faces or opposes the liquid crystal material or is formed in the liquid crystal layer, to decrease permeability to air or water vapor. Transparent electrodes are formed on the inner surface of the transparent plate which faces the liquid crystal material.

Accordingly, it is an object of the invention to provide an improved liquid crystal display panel.

It is another object of the invention to provide an improved liquid crystal display panel wherein at least one of the transparent plates is formed of a polymeric material.

It is a further object of the invention to provide an improved liquid crystal display panel wherein at least one of the transparent plates is formed of a polymeric material having a transparent film on the outer surface which is resistant to air and water vapor.

Still another object of the invention is to provide an improved liquid crystal display device wherein at least one of the transparent plates is formed of a polymeric material having a synthetic resin layer on the surface thereof.

A further object of the invention is to provide an improved liquid crystal display panel including at least one transparent plate formed of a polymeric material having reduced permeability to air or water vapor and an improved seal between the transparent plates of the panel.

Yet another object of the invention is to provide a method for preparing a liquid crystal display panel having at least one transparent plate formed of a polymeric material.

Still other objects and advantages of the invention will in part be obvious and will in part be apparent from the specification.

The invention accordingly comprises the article possessing the features, properties, and the relation of elements and the several steps and the relation of one or more of such steps with respect to each of the others, and which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
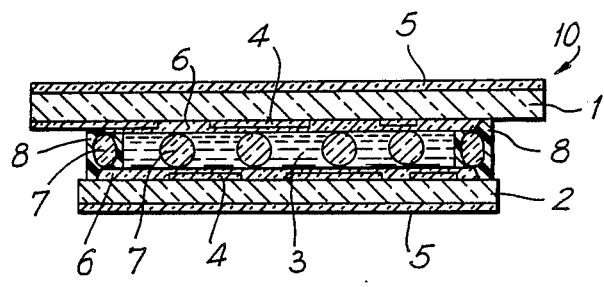
FIG. 1 is a cross-sectional view of a liquid crystal display panel including both transparent plates formed of a polymeric material constructed and arranged in accordance with a first embodiment of the invention.

Transparent plates are formed of at least one of materials consisting of polyether resin, cellulose resins such as cellulose diacetate, cellulose triacetate and butyle acetate, polyethersurfone resin, acrylic resin, polyethylene terephthalatic resin, phenoxy resin, phenoxy-urethane resin, urethan resin, polyether-ketone resin, polyether-ether-ketone resin, polyimideamide resin, polycarbonate resin and polysurfone, or may have multilayers formed of some materials of the above mentioned resins. A polarizing film may also be attached to the transparent plate. In addition, the polarizing film may comprise a PVA film containing a dichroic dye having a polarizing power, or a combination of any such PVA film and cellulose acetate film or K film. Alternately, the transparent plate itself may be formed from such a polarizing film. The one surface of the transparent plate may have an aluminum foil or aluminum bonded thereto, or the transparent plate may have a layer of aluminum or silver applied to it by an evaporation or sputtering process. The liquid crystal layer according to the present invention may be held by the same or the different kinds of the transparent plates formed of materials mentioned above. Acrylic resin may be coated on the transparent plate to a thickness of 1-2$\mu$. As examples of such transparent plates having under coat layer of acrylic resin, there are a polycarbonate plate, a polysurfone plate and the like. The transparent plate may have a thickness about 0.025 to 1,5 mm. In practice, the transparent plate having a thickness of about 0.025 to 1 mm is preferred in order to form a satisfactory thin liquid crystal panel. However, the transparent plate having a thickness of about 0.05 to 0.2 mm is suitable. Synthetic resins of the transparent plate as mentioned above have high transparency and good adhesion with a transparent conductive film formed of $SnO_2$, $In_2O_3$, ITO and the like. When the transparent plate is formed of the synthetic resins by extrusion process, optical activity is not generated. Furthermore, when the transparent plate is formed of the synthetic resins by unaxial orientation process, if polarizing axis of a polarizer is parallel or perpendicular to the unaxial orientation with tolerance of 5° and preferably 2°, optical activity is not inferior in display quality. For example, the transparent plates (combined with a polarizer) are formed of polyethylene terephthalatic resin by unaxial orientation process.

According to the present invention, the liquid crystal display panel has a barrier coating layer on the surface of the transparent plate for reducing permeability to air or water vapor, so that the display panel of the present invention can provide excellent reliability though the extrode plate is formed of a plastic material. It is desirable that the barrier coating layer of the liquid crystal display panel can reduce permeability to both air and water vapor. However, even if permeability to either air or water vapor is reduced, it can provide a liquid crystal display panel which is high in display quality and practical.

The barrier coating layer may be formed on the surface of the transparent plate which faces the liquid crystal material or the surface which opposes the liquid crystal material or the both surfaces.

Such a barrier coating layer can be formed of organic resin. The barrier coating layer formed of organic resin will be described. The organic barrier coating layer may be formed on the surface of the transparent plate which faces the liquid crystal material or the surface which opposes the liquid crystal material. When the organic barrier coating layer is formed on the surface of the transparent plate which faces the liquid crystal material, there are some limitations. First, the order should be either electrode plate, electrode, barrier coating layer and orientation film, or electrode plate, barrier coating layer, electrode and orientation film. In case of the former, the barrier coating layer can be also used for the orientation film. Moreover, the barrier coating layer should not be formed on the terminal connected to the outside circuit or on the upper and the lower electric conductive portions connected by electrode adhesive material. If the orientation film is formed on the barrier coating layer, when the orientating agent is fired, some constituent of the barrier coating layer must be prevented from mingling in the liquid crystal material through the orientating agent. However, when the barrier coating layer is formed on the surface of the transparent plate which opposes the liquid crystal material, there is no need to consider the above-mentioned limitation.

When a barrier coating layer is formed of polyvinylidene chloride resin, it must be formed on the outer surface of transparent plate of reducing permeability to both air and water vapor. If polyvinylidene chloride resin film is formed on the inner surface of the transparent plate, when the orientating agent is fired, chlorine ion or hydrochlic acid tends to be generated within the liquid crystal layer, so that the liquid crystal material may be deteriorated. Accordingly, polyvinylidene chloride resin film must be formed on the outer surface of the transparent plate.

When a barrier coating layer is formed of polyvinylalcohol (PVA) resin film, it can be formed on the outer or the inner surface of the trasnparent plate. In this case, polyvinylalcohol resin film is effective for reducing permeability to air, but is not for reducing permeability to water vapor.

When a barrier coating layer is formed of polyacrylonitrile (PAN) resin film, it can be formed on the outer or the inner surface of the transparent plate. In this case, polyacrylonitrile resin film is effective for reducing permeability to air, but is not for reducing permeability to water vapor.

When a barrier coating layer is formed of polyvinyl butyral (PVB) resin film, it must be formed only on the outer surface of the transparent plate. In this case, the orientating agent and PVB resin film are formed on the transparent plate by applying solution of the orientating agent in an appropriate solvent and by laminating the polyvinyl butyral film and the orientating agent thereon. Accordingly, if PVB resin film is formed on the inner surface of the transparent plate, the barrier layer tends to swell or dissolve in the liquid crystal material. Accordingly, PVB resin film must be formed on the outer surface of the transparent plate. When a barrier coating layer is formed of the mixture of PVA and acrylic resin film, it can be formed on the outer or the inner surface of the transparent plate. In this case, the mixture employs acrylic resin in the quantity of approximately 20–50% by weight. It is, in addition, advisable to employ the acrylic resin in the quantity of approximately 30% by weight. The barrier coating layer is effective for reducing water vapor and may be cured by ultraviolet light.

When a barrier coating layer is formed of the mixture of PVB and epoxy resin, it can be formed on the outer and the inner surface of the transparent plate. In this case, the mixture employs epoxy resin in the quantity of approximately 10–40% by weight. It is, in addition, advisable to employ epoxy resin in the quantity of approximately 20%.

A barrier layer may be formed of PAN resin film on a prime coat with urethan resin. The thickness of urethan primer is generally between approximately 500 Å to $5\mu$, and preferably between approximately 5 to $50\mu$, so that the transparent plate can have calcination. PAN resin film and the transparent plate are adhesived sufficiently by urethan primer disposed therewith. The barrier coating layer can reduce permeability to air or water vapor in the thickness of above $5\mu$. It can not only reduce permeability to air and water vapor but also have calcination in the thickness between approximately $5\mu$ to $50\mu$. The barrier coating layer may be formed on the under coat layer with acrylic resin or on the opposite side of the urethane coat layer. The acrilic resin is thermosetting resin. When acrylic resin film is formed on the inner surface of the transparent plate, the barrier coating layer is formed by applying solution of the orientation layer in the solvent. In this case, the barrier coating layer does not swell by reaction with the solvent. Moreover, in case the under coat layer of acrylic resin is formed between the barrier coating layer and the liquid crystal material, the constituent of the barrier coating layer can be prevented from mingling in the liquid crystal material, when or after the barrier coating layer is formed on the transparent plate. The under coat layer of acrylic resin can prevent the constituent of the barrier coating layer from mingling in the liquid crystal in the thickness of about 500 Å or more and more preferably between about 1 to 2μ. As examples of the transparent plate employing under coat layer of acrylic resin, the transparent plate is formed of the barrier coating layer of polyvinylidene chloride resin on the acrylic under coat on the inner surface of transparent plate which faces the liquid crystal material. The barrier coating layer formed of PAN or PVA is also used for the orientation layer.

The barrier coating layer can be formed of inorganic resin such as $SiO_2$ material, and phosphoric acid-iron material. Such basrrier coating layer can be formed on the inner surface of the transparent plate which faces the liquid crystal material and the surface which opposes the liquid crystal material. The thickness of the coating layer of $SiO_2$ is approximately 0.5μ and more for reducing permeability to air and water vapor, between about 0.5 to 2μ for having flexibility, and preferably approximately 1μ. It can be deposited on the transparent plate by, for example, a sputtering or evaporation process. Furthermore, it can be deposited on it by chemical reaction and heat treatment after coating with organic or inorganic material having Si.

As an example of a barrier coating layer formed of phosphoric acid-iron material, there is a phosphoric acid glass having Fe. The thickness of the coating layer is 5μ and more for reducing permeability to air and water vapor, and approximately 10μ for reducing permeability and having flexibility characteristics.

Referring to FIG. 1, a first embodiment of a liquid crystal display panel prepared in accordance with the invention is shown generally as 10. Liquid crystal display panel 10 includes an upper transparent plate 1 and an opposed spaced apart lower transparent plate 2. Plates 1 and 2 are both formed of a phenoxy resin and are maintained spaced apart by a plurality of spacers 7 with a seal 8 for enclosing the space between transparent plates 1 and 2. Spacers 7 are generally formed of glass, glass fiber and the like and may be formed in a spherical, cylindrical or other suitable configuration.

Transparent electrodes 4 are disposed in the inner opposed surface of transparent plates 1 and 2. Transparent electrodes 4 are formed of $SnO_2$, $In_2O_3$, ITO and the like. An orientation layer 6 is formed across the inner surface of transparent plates 1 and 2 over transparent electrode 4. A polyvinylidene chloride resin layer 5 for reducing permeability to air and water vapor is formed on the outer surface of upper transparent plate 1 and lower transparent plate 2.

Transparent plates 1 and 2 are each between about 0.25 to 1.5 mm in thickness. As the thickness of transparent plates 1 and 2 is reduced, for example to between about 0.25 to 1 mm, then 0.03 to 0.5 mm and finally to 0.03 to 0.2 mm, the preference of a user for a thin liquid crystal display panel becomes more distinct and the bending strength of the panel is improved. Production of the display panel is simplified if the resin layers are available in film form.

The thickness of transparent electrodes 4 is generally between about 100 to 2,000 Å, and preferably between about 100 to 700 Å. When transparent electrodes 4 are formed of ITO, the mixing ratio of indium oxide system to the tin oxide system is generally between about 0.05 to 200. Transparent electrodes 4 are formed on phenoxy resin transparent plates 1 and 2 by spattering, deposition, ion plating and the like. Once deposited, electrodes 4 are formed into a desired electrode pattern by chemical etching, ion beam etching, plasma etching, photolithography and the like.

An orientation film 6 is formed across each transparent electrode 4 and is generally, a polyimide resin, a polyamide resin or a polyimideamide resin in a thickness of about 5 to 1,000 Å. Orientation treatment is performed by rubbing. When orientation films 6 are formed of a polyimide resin, they are calcined at between about 100° to 200° C. for between 1 to 3 hours to drive off any volatile material. Orientation films 6 are formed on transparent plates 1 and 2 by dipping, printing and the like.

Transparent plates 1 and 2 are maintained spaced apart by spacers 7 which may be formed of glass or a glass filber. Seal 8 is formed about the perifery of the space between plates 1 and 2 by screen printing, offset printing, hand drawing and the like. Seal 8 is formed of an epoxy, a silicone, a urethane, an acrylic resin or similar suitable resin. The thickness of liquid crystal material 3 in the space is generally between about 1 to 12 μm.

Polyvinylidene chloride resin films 5 formed on the outer surfaces of upper transparent plate 1 and lower transparent plate 2 are generally of a thickness between about 3 to 100 μm, and preferably between about 5 to 50 μm. Polyvinylidene chloride film 5 is formed on phenoxy resin transparent plates 1 and 2 by applying a solution of polyvinylidene chloride in an appropriate solvent by brushing, dipping, screen printing, offset printing, gravure printing, or by laminating a film of polyvinylidene chloride thereon. The thickness of a layer of polyvinylidene chloride resin of about 3 μm or more imparts a sufficient moisture barrier to permit use of a transparent plate formed of a synthetic resin material in a liquid crystal display device.

Figure 2:
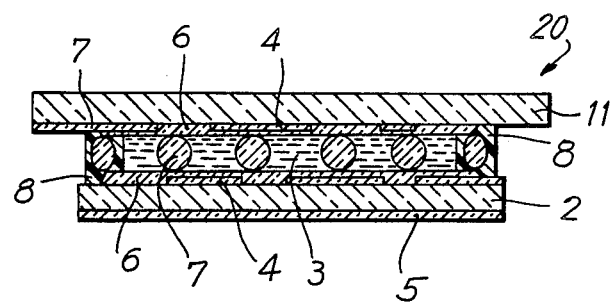
FIG. 2 is a cross-sectional view of a liquid crystal display panel having a lower transparent plate formed of a polymeric material constructed and arranged in accordance with a second embodiment of the invention.
Figure 3:
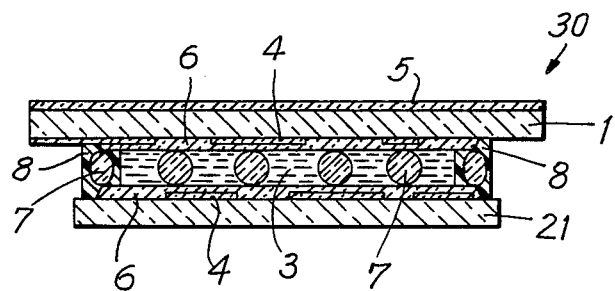
FIG. 3 is a cross-sectional view of a liquid crystal display panel having a upper transparent plate formed of a polymeric material constructed and arranged in accordance with a third embodiment of the invention.

In the embodiment of the invention illustrated in FIG. 1, both transparent plates 1 and 2 of liquid crystal display panel 10 are formed of a synthetic resin. It is also possible to replace only one inorganic glass plate of a typical liquid crystal display device with a synthetic resin plate. In this embodiment, an upper transparent plate 11 is formed of a glass material as shown in liquid crystal display panel 20 in FIG. 2. Alternatively, a lower transparent plate 21 may be formed of a glass material as shown in liquid crystal display panel 30 in FIG. 3. When one of the transparent plates of a liquid crystal display panel is formed of a glass material and the other is formed of a synthetic resin as shown in FIGS. 2 and 3, the thickness of glass plate 11 and 21 is generally between about 0.1 to 1.5 mm, and more preferably between about 0.2 to 0.7 mm.

The following examples illustrating the invention are set forth for purposes of illustration only and not in a limiting sense.

EXAMPLE 1

Into a mixed solvent of 600 g of tetrahydrosilane and 300 g of toluene was placed 100 g of a polyvinylidene chloride resin. This solution was coated onto a phenoxy-urethane resin film in a thickness of 0.1 mm by using a gravure coater and allowed to dry to form a film. The thickness of the polyvinylidene chloride film was 0.01 mm. On the opposed surface of the phenoxy-urethane resin film a conductive film of an indium oxide-tin oxide system (composition ratio of 95:5) was formed to a thickenss of 500 Å by low temperature sputtering. This ITO conductive film was formed into a predetermined electrode shape by photolithography. A polyimide resin was then coated on the electrode surface to a thickness of 500 A and dried at 150° C. for 1 hour to form an orientation film. This orientation film was rubbed with gauze in one direction to impart orientation.

A flexible epoxy adhesive was screen printed onto the surface of the transparent plate having the orientation film in a sealing pattern. A silver-based conductive adhesive was applied to this transparent plate and another separately and similarly prepared transparent plate to make them electrically conductive to each other. Fine particles of glass fiber of 10 microns in diameter were scattered on the transparent plate and the two transparent plates were assembled as an upper and lower transparent plate of a display panel and cured by heating at 100° C. for 1 hour. A liquid crystal material was injected into the space between the transparent plates and sealing material by vacuum injection. The injection inlet was sealed with an epoxy resin to provide a liquid crystal display cell.

EXAMPLE 2

One surface of a phenoxy resin transparent plate having a thickness of 1.0 mm was coated with a polyvinylidene chloride resin to a thickness of 0.01 mm. The moisture and gas barrier properties of the phenoxy resin plate were improved. Specifically, the permeability to water vapor was reduced from 20 cc/m$^2$/24 H to 2.9 cc/m$^2$/24 H. The permeability to oxygen gas was reduced from 41 cc/m$^2$/24 H/atm to 3.5 cc/m$^2$/24 H/atm. All tests were at 25° C.

On the opposed surface of the phenoxy resin plate which was not coated with polyvinylidene chloride, an ITO film was coated to a thickness of 200 Å by sputtering. The ITO film was then processed into a selected electrode pattern by photolithography. A polyimide resin was coated across the surface of the electrodes to a thickness of 500 Å and heated at 150° C. for 1 hour. This polyimide orientation film was treated for orientation by rubbing in one direction with gauze.

Glass fibers were scattered on the transparent plate and an epoxy resin was printed about the periphery in a sealing pattern by screen printing. A silver-based conductive adhesive was applied to the transparent plate and another separately and similarly prepared transparent plate in order to make them electrically conductive with each other. The two transparent plates were assembled and the adhesive was cured by heating. A liquid crystal material was injected into the space between the plates by vacuum injection. The injection inlet was sealed with an epoxy resin to form a liquid crystal display cell. Polarizing plates were placed on the upper and lower surfaces of the liquid crystal cell thereby providing a liquid crystal display panel constructed and arranged in accordance with one embodiment of the invention.

EXAMPLE 3

A liquid crystal display cell was constructed in the same manner as in Example 1, except that a glass plate 0.7 mm in thickness was used in place of one of the transparent resin plates. The glass plate was treated in the same manner as the opposed synthetic resin plate in that it was provided with a conductive film and an orientation film. Upon assembly, a liquid crystal display panel in accordance with a further embodiment of the invention was provided.

EXAMPLE 4

A liquid crystal display cell was constructed in the same manner as described in Example 2, except that one of the transparent resin plates was replaced with a glass plate 0.5 mm in thickness. Electrodes and an orientation film were formed on the glass plate in the same manner as described above and upon assembly, a liquid crystal display panel in accordance with a further embodiment of the invention was prepared.

EXAMPLE 5

A phenoxy-urethane system resin was utilized as the phenoxylic system resin for a transparent plate material in accordance with the invention. Such a phenoxy-urethane system resin is, for example, one wherein the hydroxyl group in a phenoxy resin represented by the following formula:

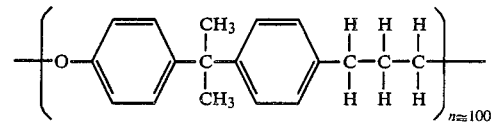

is replaced by a urethane bond:

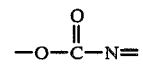

to provide the phenoxy-urethane resin having the following structure:

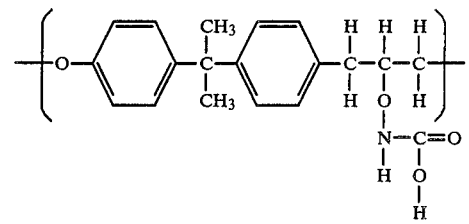

Since the phenoxy-urethane resin has urethane bonds incorporated therein, it provides a synthetic resin plate possessing both properties of a thermosetting resin and a thermoplastic resin. When electrodes are formed on one surface of the phenoxy resin plate and a polyvinylidene chloride resin film is formed on the opposed surface, the phenoxylic resin plate is suitable for use in assemblying a liquid crystal display panel in accordance with the invention.

EXAMPLE 6

Figure 4:
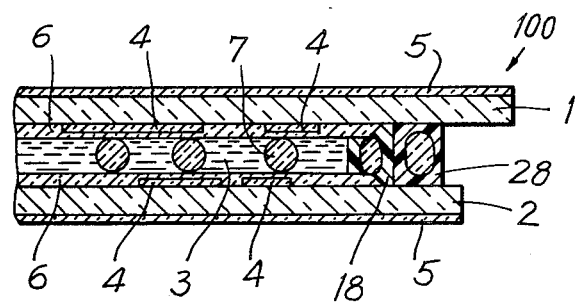
FIG. 4 is a cross-sectional view of a liquid crystal display panel havin an improved seal constructed and arranged in accordance with another an embodiment of the invention.
Figure 5:
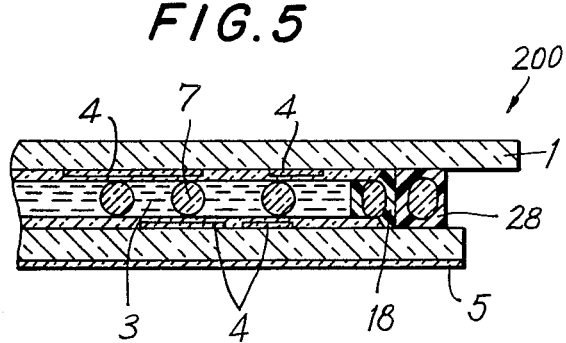
FIG. 5 is a cross-sectional view of a liquid crystal display panel having an improved seal constructed and arranged in accordance with a further an embodiment of the invention.

FIGS. 4 and 5 illustrate liquid crystal display panels shown generally as 100 and 200, respectively, which are constructed in a similar manner to liquid crystal display panel 10 in FIG. 1 and panel 20 in FIG. 2. Accordingly, like elements are identified by the same reference numerals. In the case of liquid crystal display panels 100 and 200, the panels are sealed with a double-layer seal wherein an inner seal 18 adjacent to liquid crystal material 3 is a silicon adhesive and an outer seal 28 adjacent to inner seal 18 is an epoxy resin.

EXAMPLE 7

A liquid crystal display panel was constructed in accordance with the procedure described with Example 1, except that the liquid crystal injection inlet was sealed with a silicon resin and an epoxy resin was disposed on the silicon resin.

EXAMPLE 8

A liquid crystal display panel was constructed in accordance with the procedure described with Example 2, except that the liquid crystal injection inlet was sealed with a silicon resin and an epoxy resin disposed on the silicon resin.

When the transparent plate of the liquid crystal panel is a polarizing plate having transparent electrode, if coating layer is on the surface of the polarizing film of the polrarizing plate which opposes the liquid crystal material, the polarizing film and the liquid crystal material are protected by one coating layer.

The coating layer may be formed on not only the surface of the transparent plate but also between the transparent plates. For example, the liquid crystal display panel may have the coating layer deposited between two polyethylene terephthalate films. In this case, two films are combined by lamination or extrusion process. The liquid crystal display panel can have two transparent plates, one having a coating layer and the other having a reflective layer. The reflective layer is deposited on the transparent plate by lamination with materials such as silver and aluminum, a sputtering or evaporation of the materials, or coating with powder of the materials. The transparent plate having such reflective layer can cut off air and water vapor into the liquid crystal material. Accordingly, there is no need to provide a barrier coating layer in addition to the reflective layer. When the reflective layer is laminated with material such as aluminum and silver having high reflective rate by a sputtering or evaporation, the thickness of the reflective layer is between about 1000 Å to $1\mu$, and preferably about $0.5\mu$ for having flexibility characteristics and sufficient reflective characteristics.

The liquid crystal display cell constructed in accordnance with the invention as described in the examples may include a wide variety of liquid crystal materials. The liquid crystal display cell may include a twisted nematic liquid crystal material for providing a twisted nematic-type display panel with polarizing plates on the upper and lower surfaces of the display cells. Similarly, a one-polarizing plate-type twisted nematic type display panel may be formed with only one polarizing plate on the upper surface, a guest-host type display panel incorporating a dye, a guest-host type display provided with one polarizing plate on the upper surface, as well as a DSM-type or an ECB type, a smectic-type display panel may also be formed. The transparent plate of the synthetic resins described in the above embodiment may also be utilized if the resin is in a film form. By utilizing a continuous film of the synthetic resin material, it is also possible to process the film into transparent plates for a display device by a continuous process.

The liquid crystal display panels in accordance with the invention are characterized in that the conventional glass plates are replaced by plastic transparent plates. Various problems related to optical rotation, adhesion of the transparent electrodes which generally arise by replacement of the glass plates are avoided by utilizing the transparent plate of synthetic resin described in the above embodiment. Difficulties relating to permeability to air, permeability to water and permeability to water vapor are eliminated by providing the barrier coating layers of the synthetic resin described in the above embodiments on the surface of the transparent plastic plate. Reliability of display devices in accordance with the invention are enhanced by preventing generation of bubbles within the liquid crystal material and hydrolysis due to water thereby permitting such liquid crystal display panels to be used for commercial products. Additionally, liquid crystal display panels formed from transparent plastic plates in accordnace with the invention are flexible, while maintaining reliability and can be utilized in various types of devices, and particularly for table devices, such as pocket calculators, wrist-watches, and the like. Finally, liquid crystal display panels prepared in accordance with the invention can be curved, thereby providing new expanded market opportunities for the liquid crystal display panels. Transparent plastic plates formed of the synthetic resin such as phenoxy resin are free from optical rotation and can provide a clear display for the liquid crystal display device. Conventional transparent conductive films exhibit good adhesion to such plastic plates, thereby providing excellent reliability.

The transparent plastic plates utilized in the liquid crystal display devices in accordance with the invention are characterized in that the film for reducing permeability to air and/or water vapor is laminated onto the transparent plate formed of a synthetic resin exemplified heretofore. As the exemplified synthetic resins have excellent flexibility characteristics, by constructing a pair of transparent plates for holding the liquid crystal material of this material, the display device may be provided with a curvature or may be deformed during use. When this occurs the liquid crystal material will not deteriorate due to hydrolysis with water nor will bubbles be generated within the liquid crystal layer, since the transparent plates are formed of a laminate of a synthetic resin such as a phenoxy resin and the film which has low permeability to water vapor and/or air, such as a polyvinylidene chloride resin film.

Bending the transparent plates during manufacture or use will not cause cracking of the synthetic resin plate or the film according to the embodiments. This is assured by making the synthetic resin plate and the film in the thicknesses described above for attaining these superior properties. When thin glass plates are utilized, they are easily breakable by contact bonding or on handling during assembly, thereby reducing productivity. In contrast, by utilizing the transparent plastic plates in accordance with the invention, productivity is increased because the plates do not break on rubbing, assemblying by contact bonding, handling or further assembly. Significantly, a liquid crystal display panel constructed and arranged in accordance with the invention is light in weight and does not shatter on impact when dropped.

When it is desirable to construct a liquid crystal display device in a fixed and flat shape, it is also possible and advantageous to construct the display panel utilizing one glass plate and the opposed plate of the transparent plastic material in accordance with the invention. In accordance with this embodiment of the invention, a flat-shaped liquid crystal display panel utilizes one conventional glass plate while retaining the flexibility of the synthetic resin plate on the opposed side.

Additionally, when the seal about the liquid crystal display cell is formed in a dual structure of an epoxy adhesive followed by a silicon adhesive, permeability to water and air are suppressed by the epoxy adhesive while the silicon adhesive firmly joins the transparent synthetic resin plates.

When at least one of the transparent plates of a liquid crystal display panel in accordance with the invention is formed from a transparent plastic material, the liquid crystal panel is lightweight and serves to reduce the weight of the display equipment utilizing the display panel. Further, since the plastic resin may be made thin, the thickness of the entire liquid crystal display panel and also the display device utilizing the panel can be reduced. Thus, display panels in accordance with the invention can provide long-life reliable display devices even though plastic materials are utilized as the transparent plates.

The liquid crystal display panels in accordance with the invention are characterized in that the conventional glass plates are replaced by plastic transparent plates. Various problems related to optical rotation, adhesion of the transparent electrodes which generally arise by replacement of the glass plates are avoided by utilizing a phenoxy resin plate. Difficulties relating to permeability to air, permeability to water and permeability to water vapor are eliminated by providing a polyvinylidene chloride resin film on the outer surface of the transparent plastic plate. Reliability of display devices in accordance with the invention are enhanced by preventing generation of bubbles within the liquid crystal material and hydrolysis due to water thereby permitting such liquid crystal display panels to be used for commercial products. Additionally, liquid crystal display panels formed from transparent plastic plates in accordance with the invention are flexible, while maintaining reliability and can be utilized in various types of devices, and particularly for table devices, such as pocket calculators, wristwatches, and the like. Finally, liquid crystal display panels prepared in accordance with the invention can be curved, thereby providing new and expanded market opportunities for the liquid crystal display panels.

According to the present invention, the liquid crystal display panel can provide a display device which is small in thickness and weight, and has good quality. The liquid crystal display panel can be utilized for portable display devices such as calculators, portable computers, cash cards having display devices and portable television, and wall type televisions. If the liquid crystal display panel has flexibility characteristics, it can be utilized more for such display devices, because if the thin display devices are utilized, they are not easily breakable by contact bonding or on handling during assembly.

It is also to be understood that all matter contained in the above description of the present invention is applied to electro chromic display luminesence display, cataphoresis element or the like by substituting other words for "liquid crystal material".

It will thus be seen that the objects set forth above, among those made apparent from the preceding description, are efficiently attained and, since certain changes may be made in the article set forth without departing from the spirit and scope of the invention, in carrying out the above process it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid crystal display panel, comprising two spaced apart transparent substrates, each substrate having transparent electrodes selectively formed on the interior opposed surfaces thereof, at least one of the transparent substrates being formed of a synthetic resin selected from the group consisting of polyester resin, cellulose resin, polyether sulfone resin, polysulfone resin, acrylic resin, polyethylene terephthalate resin, phenoxy resin, urethane resin, phenoxy-urethane resin, polyether-ketone resin, polyether-ether-ketone resin, polyetherimide resin, epoxy resin, polyimide resin, polyamide resin, polyimideamide resin, polycarbonate resin, a mixture of the above resins, and a multilayer of the above resins and having a thickness between about 0.3 to 0.5 mm and a barrier coating layer disposed thereon for reducing permeability to at least one of air and water vapor and wherein said barrier coating layer is selected from the group consisting of polyvinyl alcohol, polyacrylonitrile, a mixture of polyvinyl alcohol and acrylic resin, a mixture of polyvinyl butyral and epoxy resin, polyvinylidene chloride, polyvinyl butyral, silicon dioxide and a material containing at least phosphoric acid and iron and having a thickness between about 5 to $50\mu$ disposed thereon.

2. The liquid crystal display panel of claim 1, wherein said synthetic resin is phenoxy-urethane resin.

3. The liquid crystal display panel of claim 1, wherein said barrier coating layer is provided on the interior surface of said substrate.

4. The liquid crystal display panel of claim 1, wherein said barrier coating layer is provided on the outer surface of said substrate.

5. The liquid crystal display panel of claim 1, wherein said barrier coating layer is provided with an under coat.

6. The liquid crystal display panel of claim 5, wherein said under coat is formed of a material selected from the group consisting of an acrylic resin and an urethane resin.

7. The liquid crystal display panel of claim 1, wherein the thickness of said barrier coating layer is beteen about 500 Å to $2\mu$.

8. The liquid crystal display panel of claim 1, wherein said at least one substrate is joined with a polarizer to form a polarizing plate.

9. The liquid crystal display panel of claim 8, wherein said barrier coating layer is provided on the outer surface of said polarizing plate.

10. The liquid crystal display panel of claim 1, wherein the at least one synthetic resin substrate is one synthetic resin substrate and the other transparent substrate has a reflective coating layer having a thickness between about 1000 Å to $1\mu$ disposed thereon.

11. The liquid crystal display panel of claim 10, wherein said reflective coating layer is formed by vapor deposition or sputtering of metal onto the other substrate.

12. The liquid crystal display panel of claim 1, wherein both transparent substrates are formed of a synthetic resin.

13. A transparent substrate for a liquid crystal display panel, comprising a transparent synthetic resin film selected from the group consisting of polyester resin, cellulose resin, polyether sulfone resin, polysulfone resin, acrylic resin, polyethylene terephthalate resin, phenoxy resin, urethane resin, phenoxy-urethane resin, polyether-ketone resin, polyether-ether-ketone resin, polyetherimide resin, epoxy resin, polyimide resin, polyamide resin, polyimideamide resin, polycarbonate resin, a mixture of the above resins, and a multi-layer of the above resins and having a thickness between about 0.3 and 0.5 mm having transparent electrodes on one surface thereof and a transparent barrier coating layer selected from the group consisting of polyvinylidene chloride, polyvinyl alcohol, polyacrylonitrile, polyvinyl butyral, a mixture of polyvinyl alcohol and acrylic resin, a mixture of polyvinyl butyral and epoxy resin, $SiO_2$, and a material containing at least phosphoric acid and iron and having a thickness between about 5 and 50$\mu$ disposed on the surface of the synthetic resin film for reducing permeability to at least one of air and water vapor.

14. The substrate for a liquid crystal display panel of claim 13, wherein said synthetic resin is a phenoxy-urethane resin.

15. A liquid crystal display device comprising at least one liquid crystal display panel including two spaced apart transparent substrates, each substrate having transparent electrodes selectively formed on the interior opposed surfaces thereof, at least one of the transparent substrates being formed of a synthetic resin selected from the group consisting of polyester resin, cellulose resin, polyether sulfone resin, polysulfone resin, acrylic resin, polyethylene terephthalate resin, phenoxy resin, urethane resin, phenoxy-urethane resin, polyether-ketone resin, polyether-ether-ketone resin, polyetherimide resin, epoxy resin, polyimide resin, polyamide resin, polyimideamide resin, polycarbonate resin, a mixture of the above resins, and a multilayer of the above resins and having a thickness between about 0.3 to 0.5 mm and a barrier coating layer selected from the group consisting of polyvinyl alcohol, polyacrylonitrile, a mixture of polyvinyl alcohol and acrylic resin, a mixture of polyvinyl butyral and epoxy resin, polyvinylidene chloride, polyvinyl butyral, silicon dioxide and a material containing at least phosphoric acid and iron, and having a thickness between about 5 to 50$\mu$ disposed thereon for reducing permeability to at least one of air and water vapor.

16. The liquid crystal display device of claim 15, wherein said substrates have flexibility.

17. A liquid crystal display panel comprising two spaced apart transparent substrates, at least one of the transparent substrates being formed of a synthetic resin having a thickness between about 0.3 and 0.5 mm and both of the transparent substrates having transparent electrodes selectively formed on the interior opposed surfaces thereof and at least one barrier coating layer having a thickness between about 5 and 50$\mu$ disposed on the external surface of at least the synthetic resin substrate for reducing permeability to at least one of air and water vapor.

18. The liquid crystal display panel of claim 17, wherein the at least one transparent substrate further includes a second barrier coating layer disposed on the transparent electrodes.

19. A liquid crystal display panel comprising two spaced apart transparent substrates at least one of the transparent substrates being formed of a synthetic resin selected from the group consisting of phenoxy resin and phenoxy-urethane resin and having a thickness between about 0.3 and 0.5 mm and both of the transparent substrates having transparent electrodes selectively formed on the interior opposed surfaces thereof and at least one barrier coating layer having a thickness between about 5 and 50$\mu$ disposed on the external surface of at least the synthetic resin substrate for reducing permeability to at least one of air and water vapor.

20. The liquid crystal display panel of claim 19, wherein the barrier coating layer is selected from the group consisting of polyvinyl alcohol, polyacrylonitrile, a mixture of polyvinyl alcohol and acrylic resin, a mixture of polyvinyl butyral and epoxy resin, polyvinylidene chloride, polyvinyl butyral, silicon dioxide and a material containing at least phosphoric acid and iron.

* * * * *